US005286145A

United States Patent [19]
Kleine

[11] Patent Number: 5,286,145
[45] Date of Patent: Feb. 15, 1994

[54] TOOL BIT AND TOOL BIT CHUCK FOR PERCUSSION DRILLING

[75] Inventor: Christian Kleine, Achim-Uesen, Fed. Rep. of Germany

[73] Assignee: Hilti Aktiengesellschaft, Furstentum, Liechtenstein

[21] Appl. No.: 975,191

[22] Filed: Nov. 12, 1992

[30] Foreign Application Priority Data

Nov. 12, 1991 [DE] Fed. Rep. of Germany ....... 4137120

[51] Int. Cl.[5] ........................ B23B 51/02; B23B 31/10

[52] U.S. Cl. .................................... 408/226; 279/19.4; 408/239 R

[58] Field of Search .................... 279/19.2, 19.3, 19.4, 279/19.5, 19.6; 408/227, 230, 226, 239 R, 240

[56] References Cited

U.S. PATENT DOCUMENTS

| | | | |
|---|---|---|---|
| 4,691,929 | 9/1987 | Neumaier et al. | 279/19.4 |
| 4,717,292 | 1/1988 | Phillips | 408/226 |
| 4,943,192 | 7/1990 | Lafforgue et al. | 408/226 |
| 5,028,057 | 7/1991 | Wanner | 279/19.3 |
| 5,076,371 | 12/1991 | Obermeier et al. | 408/226 |
| 5,174,698 | 12/1992 | Obermeier | 408/226 |

FOREIGN PATENT DOCUMENTS

| | | | |
|---|---|---|---|
| 3941646 | 6/1991 | Fed. Rep. of Germany | 408/226 |

*Primary Examiner*—Daniel W. Howell
*Attorney, Agent, or Firm*—Anderson Kill Olick & Oshinsky

[57] ABSTRACT

A tool bit for use in a percussion drilling tool has a shank (11) insertable into a tool chuck. The shank (11) has two rotary entrainment grooves (14, 15), one smaller than the other with side flanks (16, 17) loaded during the drilling operation and not located diametrically opposite one another. In addition, the shank (11) has two locking grooves (12, 13). The rotary entrainment grooves (14, 15) are open at the end (18) of the shank insertable into the chuck, so that rotary entrainment members in the chuck can be inserted into the rotary entrainment grooves (14, 15). The locking grooves (12, 13) are closed at the ends adjacent the end (18) of the shank insertable into the chuck to assure that the tool bit is not displaced out of the chuck when the locking members are engaged. To prevent fatigue fractures or failure due to wear in the rotary entrainment grooves (14, 15) or stress peaks between the cross-sectional areas located between the locking grooves (12, 13) and the rotary entrainment grooves (14, 15), the locking grooves (12, 13) are not located diametrically opposite one another. The tool chuck contains only one locking member for reasons of manufacturing costs, and the locking member forms an angle smaller than 90° with the smaller rotary entrainment member.

6 Claims, 2 Drawing Sheets

11
13 (12)
II
II
14
15
18

16
13
α
14
15
17
12

11
22
23
IV
IV
18

23
16
α
14
15
17
22

TOOL BIT AND TOOL BIT CHUCK FOR PERCUSSION DRILLING

BACKGROUND OF THE INVENTION

The present invention is directed to a tool bit with a substantially circular shank for insertion into a tool bit chuck of a hand-held tool for percussion drilling. The shank has at least two rotary entrainment or drive grooves whose side flanks, under load when drilling, are not diametrically opposite one another and the grooves are open on the end of the shank for receiving rotary entrainment members in the tool chuck. The shank is also provided with two locking grooves which are closed or have a reduced cross-section at the end adjacent to the end face of the shank for limiting axial movement of the tool bit. Further, at least one locking member of the tool chuck can be received in one of the locking grooves.

Tool bits of this type are disclosed in DE-PS 3716915 and D-PS 3941646. Such tool bits are designed for introduction into a tool chuck only in a very specific angular position.

It has been found to be disadvantageous in tool bits of this type that the space remaining between the rotary entrainment members for receiving the locking grooves is of different magnitudes. In the rough operation experienced at a construction site, it is possible that the rotary entrainment grooves are crushed to an extent after the tool bit has been used for a long time, that the remaining residual wall thickness between a rotary entrainment groove and the locking groove is reduced, whereby the stress peaks developed at this location result in fatigue fractures. Since such failure occurs within the tool chuck of the tool, damage results not only in the loss of the bit, but also the tool itself must be repaired at considerable expense by removing the shank end located in the tool. Due to the unequal design of a shank cross-section, the possibility of fracture can occur in new tool bits.

SUMMARY OF THE INVENTION

Therefore, the primary object of the present invention is to provide tool bits of the type mentioned above where the shank is weakened to a lesser degree by the required locking grooves and rotary entrainment grooves.

In accordance with the present invention, the problem experienced in the past is avoided by locating the two locking grooves so that they do not lie diametrically opposite one another. Where the rotary entrainment grooves have different cross-sectional areas, the two locking grooves preferably define an angle of less than 180° enclosing the smaller one of the rotary entrainment grooves. This arrangement reduces the stress peak within the cross-section of the shank which occurs during percussion drilling.

Another feature of the invention is to shape the shank of the tool bit, so that the chuck of the tool effects a lasting and secure latching or locking using only one locking member. It should be noted, that the tool bit must be formed in such a way that it can also be used in powerful or heavy hammer drills in widespread use worldwide. Such hammer drills have two locking members in the form of cylindrical rollers located diametrically opposite one another which also serve simultaneously for transmitting torque to the tool bit. This twin task is solved in the present invention in a tool bit of the previously mentioned type, whereby the locking grooves have different cross-sectional areas and in a preferred embodiment the regions of the locking grooves leading in the drilling direction and adjoining the circular shank, extend approximately in a symmetrical manner at least across a portion of the cross-sectional surface. Preferably, the larger of the two locking grooves has a cross-sectional shape which is not part of a circle.

The tool bit of the present invention with the enlarged cross-sectional surface can be locked in a sufficiently secure manner in a newly developed modern hammer drill by the cost saving solution of using only one locking member, and in spite of such feature can be utilized in previously mentioned hammer drills presently in frequent use.

Therefore, the present invention also involves a tool bit chuck for percussion drilling tools with two rotary entrainment members each of a different cross-sectional area located diametrically opposite one another. The rotary entrainment members are provided for axial insertion into rotary entrainment grooves in tool bits, and there is at least one locking member guided in a recess of the tool chuck arranged to be inserted into one of the two locking grooves in the tool bit.

The arrangement of the locking member is achieved, in accordance with the invention, by providing a perpendicular line extending from the tool chuck axis intersecting the midpoint of a secant of the opening of the recess for the locking member so that the radial line forms an angle different from and preferably less than 90° with a radial line extending perpendicularly from the chuck axis intersecting the center of the smaller rotary entrainment member.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

DETAILED DESCRIPTION OF THE INVENTION

Figures 1, 2, 3, 4:
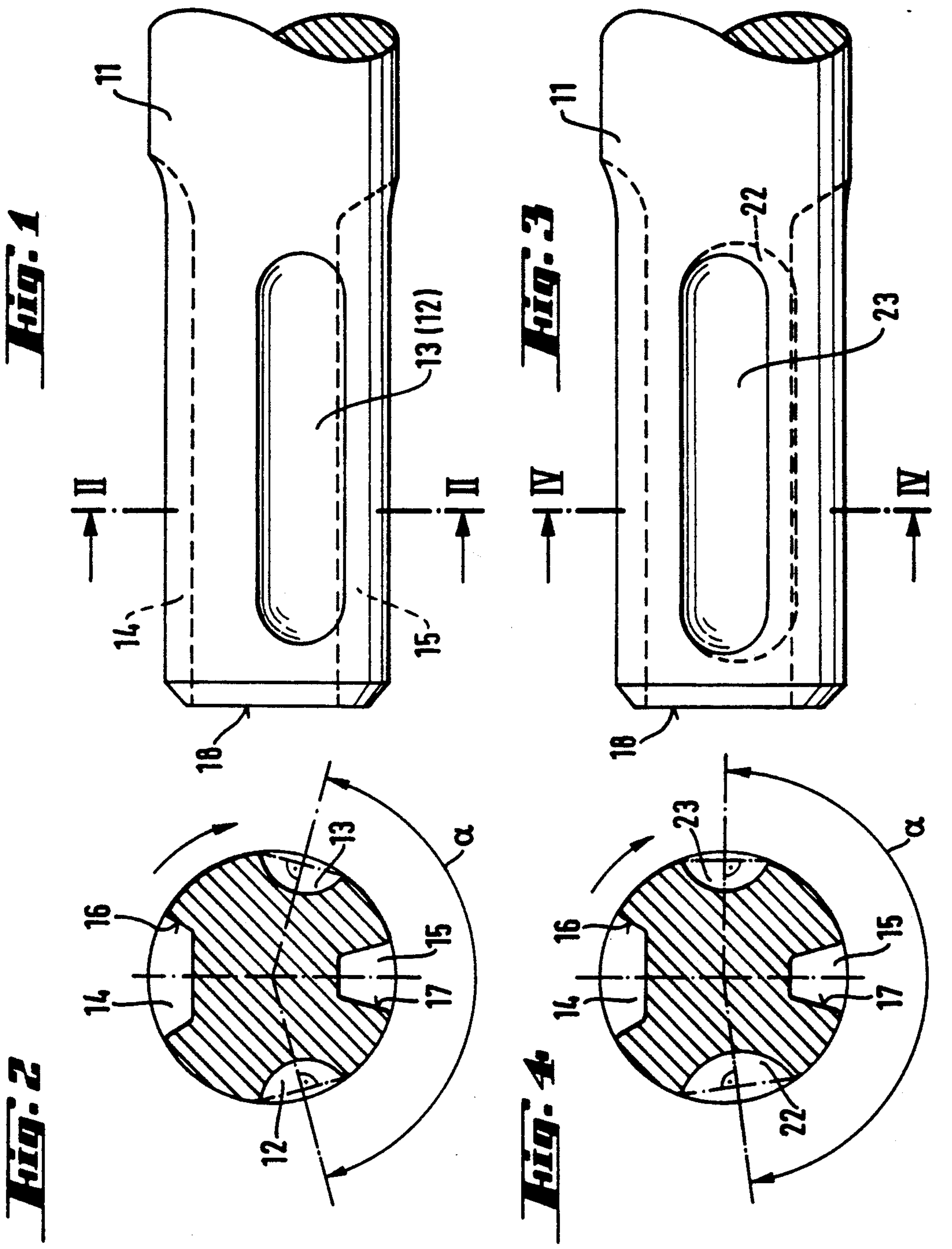
FIG. 1 is a side view of the end of a tool bit shank insertable into a tool chuck and embodying the present invention.
FIG. 2 is a cross-sectional view of the tool bit shank in FIG. 1.
FIG. 3 is a view similar to FIG. 1 of another tool bit shank embodying the present invention.
FIG. 4 is a cross-sectional view of the shank shown in FIG. 3.

An end portion of an axially extending shank 11 is shown in FIGS. 1 and 2 and includes two rotary entrainment grooves 14, 15, one smaller than the other, and two locking grooves 12, 13 offset in the circumferential direction relative to one another. The center lines of the entrainment grooves 14, 15 are located diametrically opposite one another. Each of the rotary entrainment grooves 14, 15 has a flank 16, 17 which is loaded when the drilling operation is effected. The two locking grooves 12, 13 are not disposed diametrically opposite one another. Lines extending radially from the axis of the shank and intersecting the midpoint to the secants of the locking grooves 12, 13 form an angle o smaller than 180° with the angle including the smaller one of the two rotary entrainment grooves 15. As can be seen in FIG. 1, the rotary entrainment grooves 14, 15 extend in the axial direction of the shank to the end face 18 of the shank, so that the shank 11 can be inserted axially into a tool chuck containing inwardly projecting rotary entrainment members having a cross-sectional area corresponding to the grooves 14, 15. Note the rotary entrainment members 44, 45 shown in FIG. 7. It is evident from the illustrated arrangement of the locking grooves 12, 13 that a more uniform division of the cross-sectional surface of the shank is provided affording a reduction of the stress peak and fatigue failure even under the highest loads and considerable wear.

In FIGS. 3 and 4 another embodiment of the invention is shown and differs from the above embodiment in that the locking groove 22 has a larger cross-sectional area than the locking groove 23.

Figure 5:
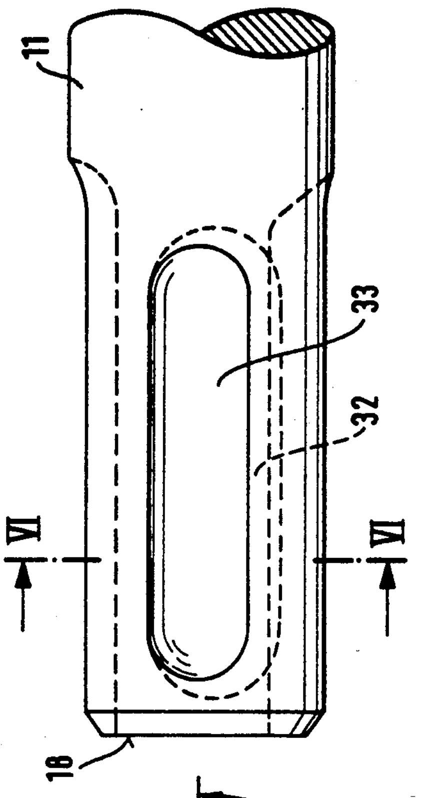
FIG. 5 is a side view, similar to FIGS. 1 and 3, of still another embodiment of the present invention.
Figure 6:
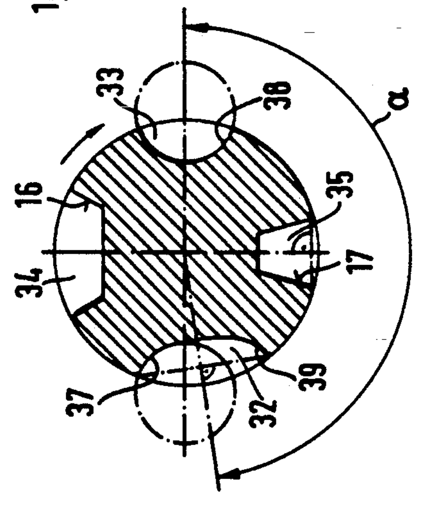
FIG. 6 is a cross-sectional view of the shank shown in FIG. 5.

In the embodiment illustrated in FIGS. 5 and 6 there is the difference from the embodiments in FIGS. 1 to 4 in that the surface 39 of the groove 32 does not form part of a circle and the regions or surfaces 37, 38 of the grooves 32, 33 adjoining the circular surface of the shank extend approximately symmetrically with respect to one another at least for a part of the cross-sectional shank area, so that this tool bit can be used in known hammer drill tools, whereby torque is transmitted only by two cylindrical rollers as displayed in FIG. 6 by the dashed line circles.

Figure 7:
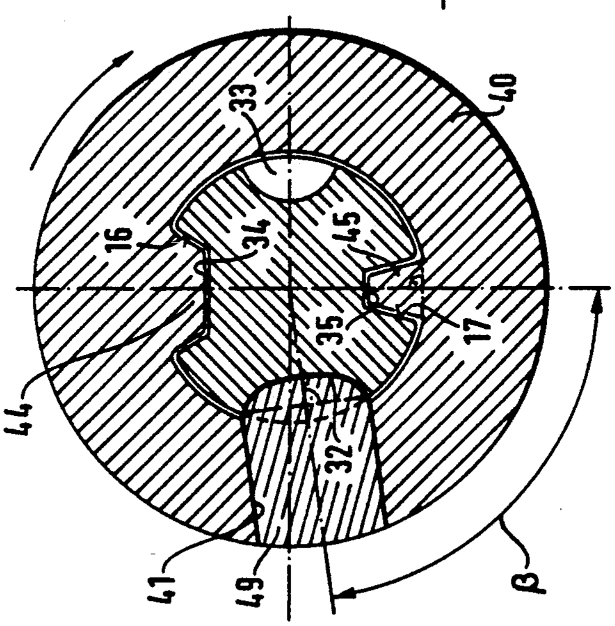
FIG. 7 is a cross-sectional view of a hammer drill chuck with a shank of a tool bit embodying the present invention inserted into the chuck.

FIG. 7 shows in cross-section a tool chuck 40 of a percussion drilling tool. The chuck 40 includes radially inwardly extending rotary entrainment members 44,45 having cross-sectional areas corresponding to the areas of the rotary entrainment grooves 34, 35 of the tool bit. A locking member 49 is guided in a radially extending bore 41 of the tool chuck 40 and engages into the locking groove 32 of the tool bit. The center line of the locking member 49 extending through the axis of the shank forms an angle $\beta$ smaller than 90° relative to the center line of the smaller rotary entrainment member 45, which center line also extends through the axis of the shank.

The tool bit embodying the present invention can be manufactured in existing production installations without involving additional costs while at the same time affording increased fatigue strength under reversing stresses. Further, the manufacturing costs for the tool chuck are reduced because of the use of only one locking member and, as a result, only one bore for the locking member in the tool chuck.

While specific embodiments of the invention have been shown and described in detail to illustrate the inventive principles, it will be understood that the invention may be embodied otherwise without departing from such principles.

I claim:

1. Tool bit comprising a substantially circular axially extending shank for insertion into a tool chuck in a hand-held tool for carrying out percussion drilling, said shank has a first end (18) insertable into the tool chuck, said shank has at least two axially extending rotary entrainment grooves (14, 15, 34, 35) each having a side flank (16, 17) loaded in drilling operation, said side flanks are not located diametrically opposite one another, said rotary entrainment grooves are open at the first end (18) of said shank for receiving rotary entrainment means of the tool chuck, said shank has two axially extending locking grooves (12, 13, 22, 23, 32, 33) spaced circumferentially from said entrainment grooves and said locking grooves are substantially close-ended at ends thereof closer to the first end (18) of said shank section for limiting axial movement of the tool bit, said locking grooves arranged to receive at least one locking member (49) of the tool chuck, wherein the improvement comprises that said locking grooves (12, 13, 22, 23, 32, 33) are not located diametrically opposite one another.

2. Tool bit, as set forth in claim 1, wherein said rotary entrainment grooves (14, 15, 34, 35) each has a different cross-sectional area with one of said rotary entrainment grooves (15, 35) having a smaller cross-sectional area located within an angle $\alpha$ smaller than 180° with the angle formed by two radially extending lines extending from the axis of the shank through midpoints of secants of the locking grooves (12, 13, 22, 23, 32, 33).

3. Tool bit, as set forth in claim 1 or 2, wherein said locking grooves (22, 23, 32, 33) each has a different cross-sectional area.

4. Tool bit, as set forth in claim 3, wherein circumferentially extending surfaces (37, 38) of said locking grooves (32, 33) extending from the circular surface of said shank and leading in the drilling direction are disposed symmetrically to one another on opposite sides of the shank axis.

5. Tool bit, as set forth in claim 4, wherein said locking groove (32) with a larger cross-sectional area has a cross-sectional shape (39) not forming a part of a circle.

6. Tool bit chuck for a percussion drilling tool comprising an axially extending annular member having a radially inner annular surface for receiving a tool bit shank and a radially outer surface, two rotary entrainment members projecting radially inwardly from said inner annular surface and located diametrically opposite one another, a first said entrainment member having a larger cross-sectional area extending transversely of the axial direction than a second entrainment member, said entrainment members arranged to extend into entrainment grooves in a tool bit shank, at least one locking member (49) guided in a radially extending bore (41) in said annular member and arranged for insertion into a locking groove in the tool bit shank, wherein the improvement comprises that said entrainment members are symmetrical about a diametrically extending line passing through centers thereof extending in the axial direction of said annular member, a first radially extending line extends from the axis of said annular member through a mid point of a secant at the inner end of said bore, a second radially extending line extends from the axis of said annular member through the center of the second entrainment member and said first and second radially extending lines form an angle $\beta$ less than 90°.

* * * * *